Feb. 23, 1960

H. F. TAPP ET AL 2,925,735

AUTOMATIC PIPE LINE SAMPLING APPARATUS

Filed Aug. 12, 1955

INVENTORS,
Harry F. Tapp and
Theodore J. Mesh,
BY Chapin & Neal,
Attorneys.

Feb. 23, 1960 H. F. TAPP ET AL 2,925,735
AUTOMATIC PIPE LINE SAMPLING APPARATUS
Filed Aug. 12, 1955 5 Sheets-Sheet 3

INVENTORS,
Harry F. Tapp and
Theodore J. Mesh,
BY Chapin & Neal
Attorneys.

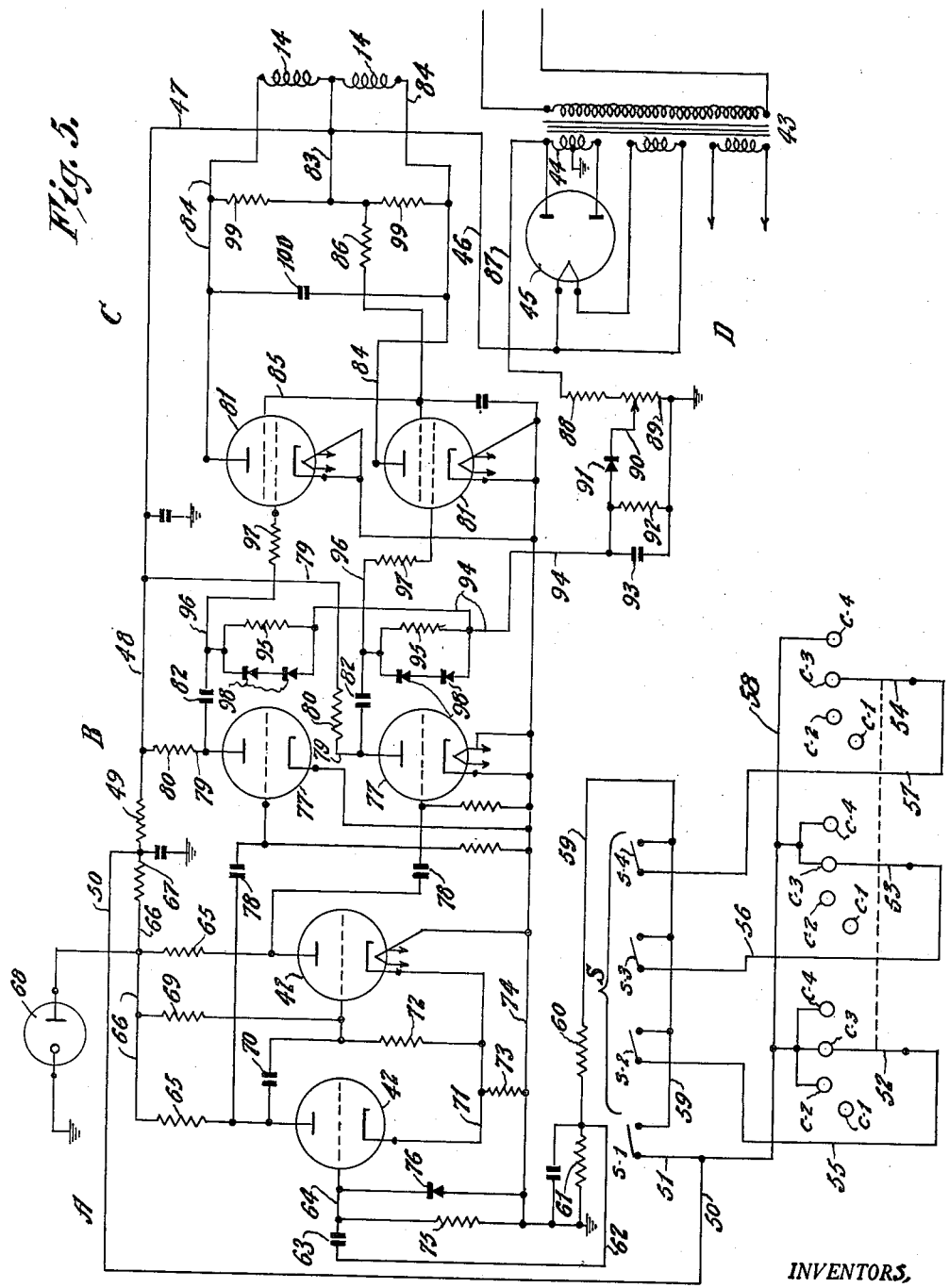

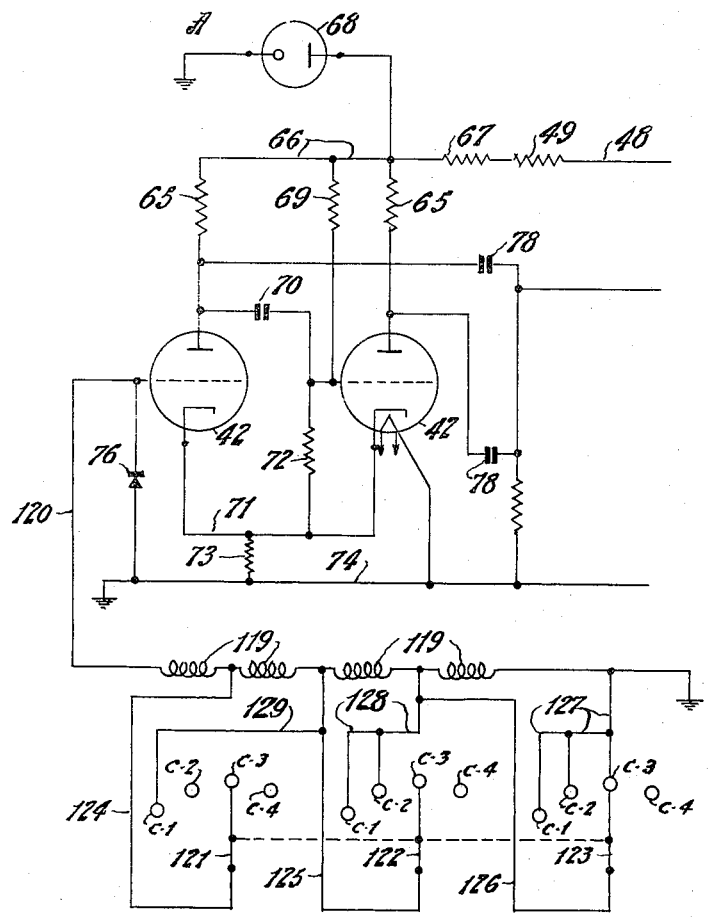

United States Patent Office 2,925,735
Patented Feb. 23, 1960

2,925,735

AUTOMATIC PIPE LINE SAMPLING APPARATUS

Harry F. Tapp, Longmeadow, and Theodore J. Mesh, Easthampton, Mass., assignors to Gilbert & Barker Manufacturing Company, West Springfield, Mass., a corporation of Massachusetts Application August 12, 1955, Serial No. 527,984

4 Claims. (Cl. 73—422)

This invention relates to improvements in automatic pipe line sampling apparatus and is an improvement on that disclosed in U.S. Patent No. 2,693,114, granted November 2, 1954, on a joint invention of Harry F. Tapp, Theodore J. Mesh and John J. Pacey.

The apparatus of the aforesaid patent includes a reciprocating-piston pump connected to the pipe line for intermittently drawing from it small measured sample quantities and discharging them into a suitable receiver. The pump piston is actuated on its suction stroke by one electromagnet and subsequently on its discharge stroke by another electromagnet. These electromagnets are successively energized by direct-current pulses produced by a multi-vibrator and suitably amplified. The time interval between the pulses is varied by means of a potentiometer, the slider of which is moved proportionately to variations in rate of flow in the pipe line. The means for moving the slider include an orifice plate in the pipe line to produce a liquid-pressure differential, a differential converter to convert such differential into air pressure and a motor actuated by air pressure and connected to move the slider. The potentiometer has to be specially constructed in order to vary the control voltage of the multi-vibrator so as to secure a pump-pulsing rate which is approximately proportional to rate of flow in the pipe line throughout a given range. The accuracy of proportional sampling depends on the accuracy of the orifice plate and the potentiometer.

This invention utilizes an apparatus that is similar to that of the aforesaid prior patent, except for the electrical pulse-producing means and except for the control of such pulse-producing means, such control being effected in a simpler and better way and resulting in improved accuracy of proportional sampling.

The invention has for an object the provision of improved means for controlling the actuation of the sampling pump directly from a meter in the pipe line, whereby the proportional sampling may be secured with an accuracy equal to that of the measuring instrument itself.

The invention also has for an object the provision of a one-shot multi-vibrator for producing at each operation two successive electrical pulses, which are amplified and then utilized for energizing successively the two magnets of the sampling pump, causing its piston to be actuated on one suction and one discharge stroke, and a control actuated by, and in timed relation to, a meter in the pipe line to periodically trigger the one-shot multi-vibrator and cause it to operate at each activation through one cycle and then stop, producing the two pulses the peak values of which are always spaced from each other by the same time interval and which are necessary for one cycle of operation of the sampling pump.

These and other objects will more particularly appear from the detailed description of the invention with reference to the accompanying drawings, in which, Fig. 1 is a small-scale diagrammatical view of a pipe line sampling apparatus embodying the invention;

Fig. 5 is an electrical diagram showing the electronic pulse-producing means for actuating the metering sampling pump and control for such means including the rotary switch element;

Fig. 6 is an electrical diagram, showing a modification in the control for the electronic pulse-producing means;

Figure 1:
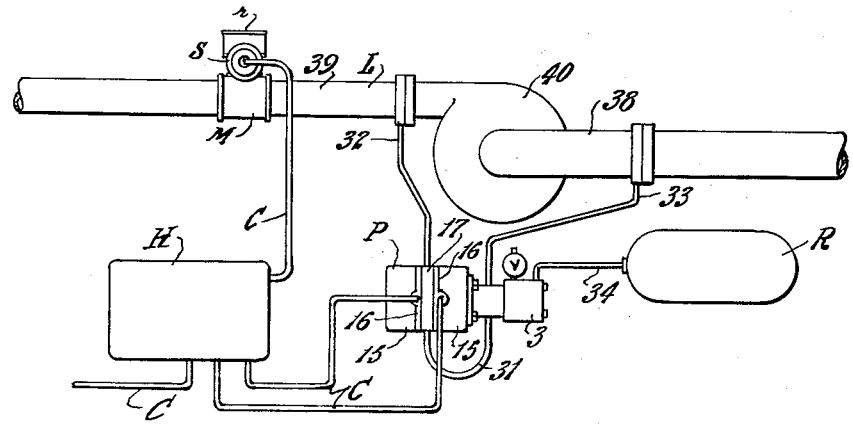

Referring to these drawings an electromagnetically-actuated metering pump P (Fig. 1), constructed like that shown in the above-named patent, is connected in a manner similar to that shown in such patent periodically to draw measured sample quantities from a pipe line L and force them into a sample receiver R. The magnet coils of the pump are alternately energized by electrical pulses produced by an electrical apparatus, which may be contained in the housing H and which is shown diagrammatically in Fig. 5. This apparatus differs from that of said patent in the manner in which the electrical pulses are controlled to vary the time interval between their peak values proportionately to the rate of flow in the pipe line. In this case, the control is effected by a meter M, which is interposed in the pipe line and has the usual register r. C represents conduits for the electrical connections between the apparatus, meter and pump.

The metering pump (Fig. 2) comprises a piston 1, reciprocable in a cylinder 2, formed within a body 3. The latter also affords an inlet passage 4, which is controlled by a spring-pressed inwardly-opening ball valve 5; a chamber 6, which communicates at all times with the inlet end of cylinder 2; and outlet passages 7 and 8, leading from chamber 6. The passage 7 is controlled by a spring-pressed outwardly-opening ball valve 9. The outlet passage 8 is normally closed by a valve 10, adapted for manual actuation and to be opened merely for flushing purposes. The body 3 also has a chamber 11, with which inlet passage 4 communicates and which has tapped inlet and outlet passages 12 and 13, respectively. The chamber 11 encompasses the outer end of the rod of the piston 1.

This metering pump is actuated electromagnetically. Coils 14 are mounted one in each of a pair of cup-shaped iron cases 15, disposed axially in opposed relation and having flanges 16 which are clamped against opposite faces of an intervening annular ring 17 of iron by means of bolts 18. Each case 15 has a central iron core fixed to its outer end wall. One of these cores, marked 19, is solid and the other, marked 20, has a central passage therethrough to slidably receive a rod 21. The pump body 3 is clamped with an intervening O-ring 22 to the closed end wall of one case 15 by means of screws 23. The outer end of rod 21 extends into chamber 11 and is there connected by the flexible coupling 21' to the outer end of the rod of the piston 1. The inner end of rod 21 has fixed thereto an armature 24, which is of iron and has conical ends to cooperate with like recesses in the confronting inner ends of the cores 19 and 20. The coils 14 are sealed within the recesses in their respective cases 15 by non-magnetic annular plates 25, having inner and outer O-ring seals 26 and 27, respectively. These rings 26 and 27 respectively engage the outer periphery of the core of the coil and the inner periphery of case 15. The outer ring 27 also serves to seal the joint between the adjacent end of its case 15 and the ring 17. Within this ring and between the plates 25 is a chamber 28, having tapped inlet and outlet openings 29 and 30, respectively. The volume of chamber 28 is reduced by spacers 36 of non-magnetic material inserted between the plates 25.

The coils 14 are energized alternately to magnetize their cores and cause the armature 24 to be moved back and forth in the space between the confronting ends of the cores. The magnetic circuit includes the end and peripheral walls of the cases 15, the ring 17 and the cores 19 and 20. When the left hand coil 14 is energized, armature 24 will be drawn to the left to move piston 1 on its suction stroke. When the right hand coil is subsequently energized, the armature 24 will be drawn back into the illustrated position to move the piston 1 on its discharge stroke. The armature preferebly has spacers 37 of non-magnetic material on opposite ends to engage the adjacent ends of the cores and prevent the sticking of the armature to the cores that might otherwise occur due to residual magnetism. The length of the stroke of the piston is controlled by the length of the air gap between the armature and its cores. As shown, the stroke of the pump piston is very short and its diameter is very small, providing in this example a displacement of .0024 cubic inch.

Figure 2:
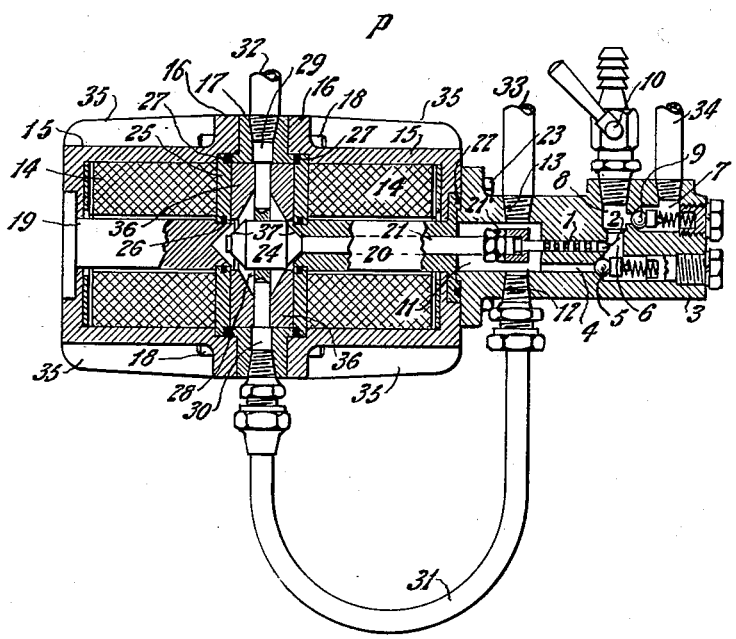
Fig. 2 is a sectional elevational view, drawn to a larger scale, of the metering pump element of the apparatus.

This pump is preferably connected to the pipe line L, as indicated in Figs. 1 and 2, such line having sections 38 and 39 and an interposed centrifugal pump 40. A pipe 32 connects the section 39 to the inlet 29 in pump member 17, and the outlet 30 in the latter is connected by a pipe 31 to the inlet 12 in pump body 3. The outlet 7 in the latter is connected by a pipe 33 to the sample receiver R. Thus, the liquid, from which small samples are to be periodically taken, is caused to flow in substantial volume and rapidly through a by-pass that includes the pipe 32, chamber 28, tube 31, chamber 11 and pipe 33, thus avoiding stagnation and helping to cool the coils 14. A fraction only of the flow is caused to pass through the described by-pass and from this by-passed stream, samples are extracted at intervals by the metering pump and discharged through pipe 33 into receiver R. The rate of pumping is controlled by varying the time interval between cycles of operation of piston 1 by means to be described.

The electrical pulse-producing means is shown diagrammatically in Fig. 5. It includes a single-shot multi-vibrator section A, a buffer-amplifier section B, a power-amplifier section C, and a power supply section D.

The one-shot multi-vibrator section is of conventional form, utilizing a dual triode 42. Power is derived from a 110 volt alternating-current supply through a transformer 43, one secondary 44 of which is connected to a full-wave rectifier 45. The latter supplies direct current at 400 volts. A switching means S, driven from the meter M, as will latter be described, controls the power that triggers or activates the one-shot multi-vibrator. To this end, rectifier 45 is connected by wires 46, 47 and 48, a 5000 ohm dropping resistor 49 and wires 50 and 51, to the switching means S. Such means preferably comprises a plurality of switches, $s-1$, $s-2$, $s-3$ and $s-4$, which are actuated by meter M successively in the order named at equal intervals in the meter cycle, each switch closing momentarily and then opening before the next switch in the series closes. These switches are connected in parallel so that the closing of any one will cause activation of the one-shot multi-vibrator.

Preferably, a selector switching means is provided, whereby one or more of the switches $s$ may be made effective. This selector switching means includes three blades 52, 53 and 54 connected to move simultaneously and respectively connected to the blades of switches $s-2$, $s-3$ and $s-4$ by wires 55, 56 and 57. Each selector switch blade is engageable with any one of a series of four contacts $c-1$, $c-2$, $c-3$, and $c-4$. A wire 58, connects wire 50 to various contacts of each series as follows, to contacts $c-2$, $c-3$, and $c-4$ of the first or left hand series; to contacts $c-3$ and $c-4$ of the next or center series; and to contact $c-4$ of the third or right hand series. When the selector switch blades engage their contacts $c-1$, switch $s-1$ only is made effective. When these blades engage contacts $c-2$, switches $s-1$ and $s-2$ are rendered effective; when these blades engage contacts $c-3$, switches $s-1$, $s-2$ and $s-3$ are rendered effective; and when these blades engage contacts $c-4$, switches $s-1$, $s-2$, $s-3$ and $s-4$ are rendered effective.

The contacts of all these switches are connected to a wire 59 and thence to a 50,000 ohm resistor 60 and a 100,000 ohm resistor 61 to the ground. These resistors are in series forming a voltage divider, which is tapped by a wire 62 that leads to a .05 mfd. condenser 63, connected by a wire 64 to the grid of the first or left hand side of dual triode 42. On closing any of these switches, a positive pulse is transmitted through condenser 63 to the grid of first section of the dual triode 42. The plates of the dual triode are connected through 68,000 ohm plate resistors 65 to a wire 66 and thence through a 8,500 ohm dropping resistor 67 and the described resistor 49 and wires 48, 47 and 46 to the rectifier 45. The resistors 49 and 67 drop the voltage to 150 volts and a voltage regulator 68 maintains the voltage uniform at that value. The grid of the right hand section of the dual triode 42 is connected through a 10 megohm resistor 69 to the wire 66 and through a .05 mfd. condenser 70 to the plate of the left hand section. The cathodes of the dual triode are interconnected by a wire 71 which is connected through a 1.5 megohm resistor 72 to the grid of the right hand section of the dual triode 42 and through a 10,000 ohm resistor 73 to ground wire 74. The grid of the left hand section of the dual triode 42 is connected through a 470,000 ohm resistor 75 to ground wire 74 and through a rectifier 76 to the ground wire 74. On opening of any of the switches $s$ a negative pulse is applied to the grid of the first section of the dual triode 42 but this has no effect unless it occurs before the pump cycle has been completed. To eliminate any trouble from this source the rectifier 76 is provided to shunt out pulses of negative polarity to the ground.

The buffer-amplifier section B uses a dual triode 77, the grids of which are coupled by .1 mfd. condensers 78, one to each plate of the dual triode 42. The plates of triode 77 are connected by a wire 79 through 44,000 ohm plate resistors 80 to the described wire 48 and thus to the 400 volt, direct-current supply. The power amplifier section C uses two tubes 81 of the beam power amplifier type. The grids of tubes 81 are coupled by 1.25 mfd. condensers 82, one to each plate of the dual triode 77. The magnet coils 14 of the metering pump are included, one in each, of the plate circuits of tubes 81. Each such plate circuit is connected to the 400 volt direct-current supply by wire 46. A wire 83 connects the wire 46 to one terminal of each coil 14. The other terminals of coils 14 are connected one to each of the plates of tubes 81 by wires 84. The screen grids of the latter are interconnected by a wire 85 and through a 3,000 ohm resistor 86 to wire 83.

As the two sections of dual triode 42 become alternately conducting and non-conducting, voltage drops occur across their respective plate resistors 65. As a result, the plate voltage of each section of triode 42 is alternately 150 volts or about 10 volts. The coupling capacitors 78 are unable to transmit direct current potentials but they do transfer any change in voltage to the following stage. When one of the plates of the triode 42 changes its potential from plus 10 volts to plus 150 volts, a short positive pulse is transmitted to the grid of the following tube 77 and, when its potential returns from plus 150 to plus 10 volts, a negative pulse is transmitted to such grid. The duration of each pulse depends chiefly on the value of the coupling capacitor 78, which in this example, is .1 mfd. and the resistance of the grid circuit of the following tube 77, which resistance, in this example, is 1 megohm. The pulse produced, in this example, is of less than one-tenth second in duration.

The buffer stage B serves as a cushion between the stages A and C and prevents interaction between these stages that might possibly affect the regularity of pulsing. It also assures that ample voltage is available to drive the power tubes 81. The coupling capacitors 82 apply short positive and negative pulses alternately to the grids of power tubes 81. The grids of these tubes are biased negatively almost to cut-off by the grid bias derived as follows. A wire 87 connects one terminal of secondary 44 to a 15,000 ohm resistor 88, and through the latter to a 7,500 ohm variable resistor 89 and thence to the ground. The resistor 89 is tapped by a wire 90, which connects with a rectifier 91, the latter being connected to a 470,000 ohm resistor 92 and thence to the ground. A 40 mfd. condenser 93 is shunted across resistor 92. The described grid bias supply circuit is connected to the grid of each tube 81 by a wire 94, a one megohm resistor 95, a wire 96 and a 47,000 ohm resistor 97.

The positive grid pulses overcome the grid bias momentarily and permit heavy pulses of current to flow alternately to the pump coils 14. The negative pulses are shorted out by two diodes 98, which connect wire 94, one to each wire 96. These negative pulses serve no useful purpose and were found to increase the average negative grid bias to an undesirable high value at fast pulsing rates, causing a reduction in pump power.

A 50,000 ohm resistor 99 is shunted across each pump coil 14. The purpose of these resistors is to reduce to a safe value the voltage transients, which ensue from the sudden switching on and off of current in the pump coils 14.

A 1 mfd. capacitor 100 is connected across the wires 84, which connect the two pump coils 14 to the two plates of the two tubes 81. This capacitor permits a momentary oscillatory flow of current after each pulse is completed and is of value in that such current flow demagnetizes the iron elements of the pump power unit and thereby tends to eliminate any sticking between the moving and stationary magnetic elements that might otherwise be caused by residual magnetism.

Figure 3:
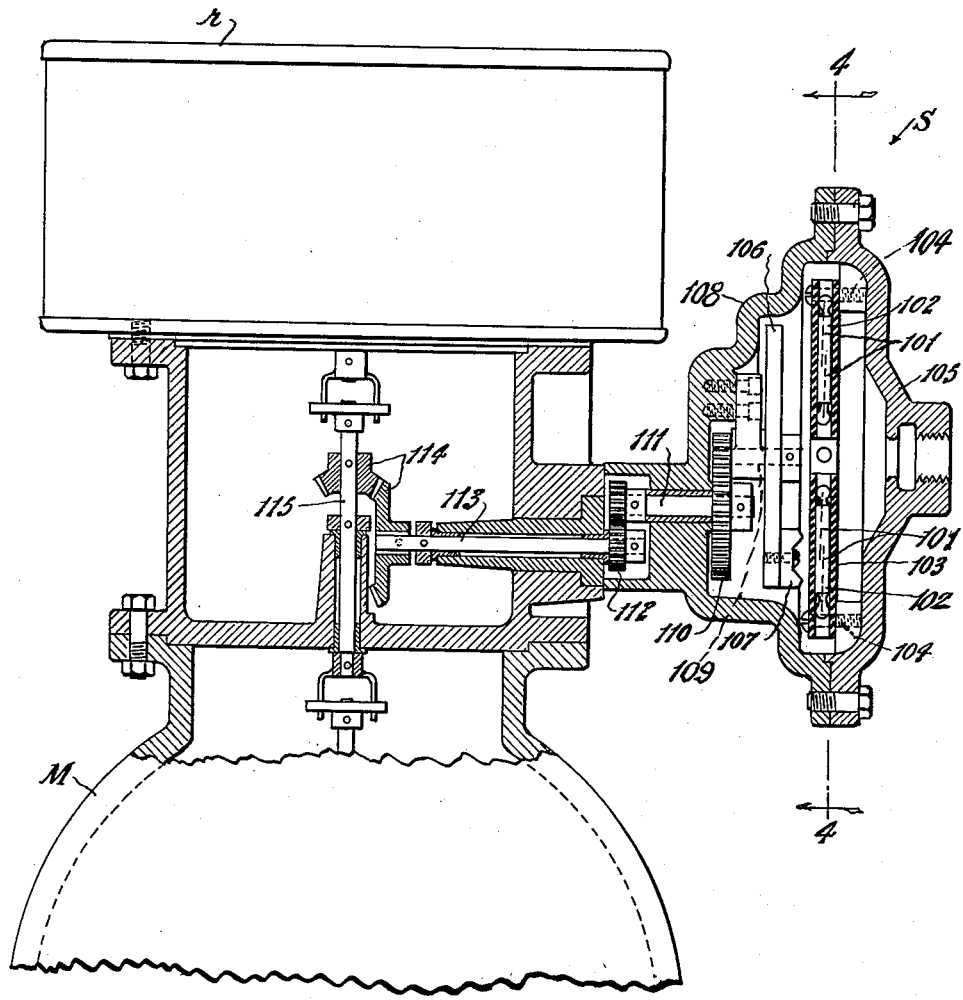
Fig. 3 is a sectional-elevational view of the rotary switching means of the apparatus and its actuating means.
Figure 4:
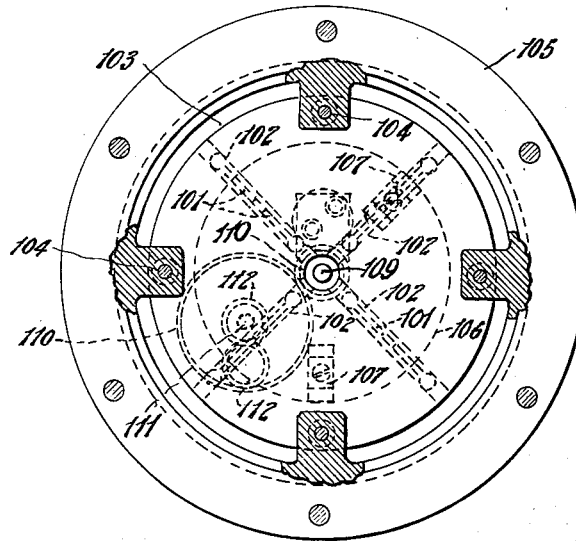
Fig. 4 is a cross sectional view, taken on the line 4—4 of Fig. 3, of the rotary switch element.

The switching means S may desirably be constructed as shown in Figs. 3 and 4 and actuated from the meter M as shown in Fig. 3. Each of the switches s–1, s–2, s–3 and s–4 includes two leaf springs 101, enclosed within a sealed glass tube 102, containing an inert gas. The non-adjacent ends of each pair of these springs are fixed in opposite ends of their tube. Their inner and adjacent ends partially overlap and these overlapping portions are normally separated by a small gap. The tubes 102 are mounted in radial holes, spaced 90° apart, in an insulating plate 103, which is fixed by screws 104 to the cap section 105 of the switch casing. The other section 108 of this casing contains a rotary plate 106 having fixed thereto as indicated one or more permanent bar magnets 107. As shown in Fig. 4, there are two such magnets, spaced 135° apart. As shown in Fig. 3, the two magnets 107 and the four tubes 102 are respectively located in two parallel planes. The plate 106 is rotatably supported by a short shaft 109, driven by spur gears 110 from a shaft 111, which in turn is driven by spur gears 112 from a shaft 113. The latter is driven by bevel gears 114 from the shaft 115, by means of which the meter M drives its register r as indicated. As plate 106 rotates, each magnet 107 will successively move into radial alignment with the four tubes 102, causing the free ends of the pair of springs 101 in each tube to be drawn together with a snap action to close the switch. As each magnet moves out of radial alignment with each tube 102, the free ends of the springs 101 therein will move apart to open the switch and this also occurs with a snap action. Where, as shown, two magnets 107 are mounted on disk 106, each switch will be closed and subsequently opened twice during each revolution. Thus, the circuit to the single-shot multi-vibrator will be closed eight times per revolution of shaft 109. As shown, the gearing between meter shaft 115 and shaft 109 is such as to drive the latter at two and one-quarter times the speed of shaft 115. Thus, the power supply to the grid of the dual triode 42 is made 18 times per revolution of the meter M. In this case, it is intended that a maximum of 300 switch cycles per minute be produced at the highest expected rate of meter rotation. With one, two or three of the switches cut out, the maximum rate may be changed to 225, 150 or 75 cycles per minute respectively.

In operation, the switching means S triggers or activates the one-shot multi-vibrator a selected number of times during each revolution of the meter. Each time one of the switches s–1, s–2, s–3 or s–4 is closed, a positive pulse is applied to the grid of the left hand section of the dual triode 42 and the latter is activated. Each time the one-shot multi-vibrator is activated, it operates one complete cycle and then stops. It produces two pulses the peaks of which are always spaced from each other by the same time interval and then stops. The pulses produced are transmitted through the amplifier stages B and C to the magnet coils 14 of the sampling pump, effecting one complete cycle of operation of the sampling pump and delivering a small measured quantity of liquid into the sample receiver R.

It should be noted that for effective operation, full power must be instantly available at all times, wherefore direct-current is needed rather than alternating-current. Direct-current is supplied, in this instance, at about 400 volts. Pipe line pressures vary widely from near zero to a maximum of 1000 p.s.i. Hence, the sampling pump piston is actuated on both strokes magnetically, return stroke actuation by a spring not being feasible because of the practical impossibility of getting one spring that will be effective over the wide range of pressures required. The magnet coils, however, present a highly inductive load and the circuit to them could not, as a practical matter, be controlled directly by a switching means in the 400 volt supply circuit. Working at the rate of 300 pulses per minute, a million makes and breaks would occur in about 2⅓ days and the apparatus must continue to operate for years. This high rate of making and breaking a highly inductive circuit with the arcing that ensues would rapidly destroy the contacts. The present meter-actuated switching means, operating only to trigger the one-shot multi-vibrator, avoids the difficulty described. Only a few milli-amperes flow in the triggering circuit so that the switch contacts have a very long life and an apparatus is provided that should operate successfully for many years.

Figure 7:
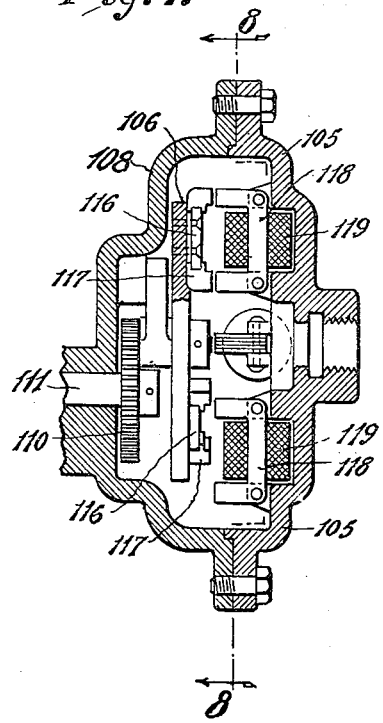
Fig. 7 is a sectional elevational view of a rotary meter-actuated control mechanism for use with the system shown in Fig. 6.
Figure 8:
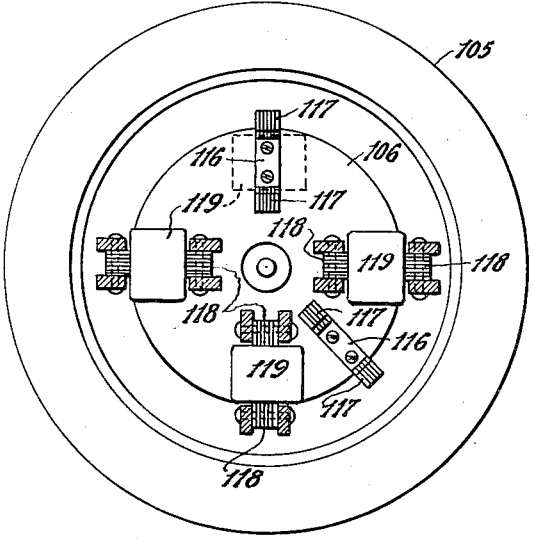
Fig. 8 is a cross sectional view taken on the line 8—8 of Fig. 7

Another means for controlling the single-shot multi-vibrator from the meter M is shown in Figs. 7 and 8. The disk 106 is driven, as described in connection with Figs. 3 and 4 and, as before, has fixed thereto two radially-disposed permanent bar magnets spaced 135° apart. These magnets, marked 116, have outturned pole shoes 117. Suitably fixed to the inner end wall of cap 105 are a plurality (four as shown) of U-shaped cores 118. The cross-bar portion of each such core carries a coil 119 and is disposed radially of the cap 105 and disk 106. The legs of the U-shaped core 118 are inturned toward disk 106 and so spaced as to magnetically connect with a pair of pole shoes 117 of a magnet 107, whenever the latter moves into radial alignment with a core 118. In this way, one complete cycle of alternating electromotive force will be produced each time a pair of pole shoes moves into and out of a position in which they register with the free ends of a core 118. Thus, as shown, 36 such cycles of alternating-current electromotive force may be produced during each revolution of meter M.

These coils 119 are indicated diagrammatically in Fig.

6 and are shown as connected in series, with one terminal of the series grounded and the other terminal connected by a wire 120 to the grid of the first section of the dual triode 42. Only the single-shot multi-vibrator A has been shown in Fig. 6, the amplifier sections B and C being the same as shown in Fig. 5 and the power supply D being the same except for the omission of power wire 50 and its subsequent connections to the grid of the dual triode 42.

One or more of the four coils 119 may be utilized, as desired. To conveniently select the desired number of active coils 119, a selector switch is employed, having three blades 121, 122 and 123, connected to move in unison and each adapted to engage four contacts, marked $c-1$, $c-2$, $c-3$ and $c-4$. The blade 121 is connected by a wire 124 to the junction between the first and second coils 119 (reckoning from the left); the blade 122 is connected by a wire 125 to the junction between the second and third coils 119 and the blade 123 is connected by a wire 126 to the junction between the third and fourth coils 119. The contacts $c-1$, $c-2$, and $c-3$ of the third (right hand) switch are connected together and to the grounded side of the fourth coil 119 by wires 127. Thus, when blade 123 is engaged with contacts $c-1$, $c-2$ or $c-3$, the fourth coil 119 will be shunted out. The contacts $c-1$ and $c-2$ of the second switch are connected together and to the wire 126 and thus to the junction between the third and fourth coils 119 by wires 128. Thus, when blade 122 is engaged with its contact $c-1$ or $c-2$, the third coil 119 will be shunted out. The contact $c-1$ of the first switch is connected by a wire 129 to wire 125 and thus to the junction between the first and second coils 119. When blade 121 engages contact $c-1$, the second coil 119 will be shunted out. It will thus be seen that when the selector switch blades 121, 122 and 123 engage their respective contacts $c-1$, an electromotive force induced in the first coil 119 only will be effective to trigger the multi-vibrator; when these blades engage their contacts $c-2$, an electromotive force induced in either the first or second coil 119 will be effective for the triggering function; when these blades engage their contacts $c-3$, an electromotive force induced in any of the first three coils 119 will be effective for the triggering function; and when these blades engage their contacts $c-4$, an electromotive force induced in any of the four coils 119 will be effective for the triggering function.

The operation of the second form of the apparatus is essentially the same as that of the first form, except that the one-shot multi-vibrator is triggered by pulses produced by the magneto-electric generating means disclosed in Figs. 7 and 8 rather than by pulses produced by periodically closing a direct-current supply circuit.

The invention thus provides an improved automatic pipe line sampling apparatus for effecting proportional sampling in a simple and effective way by electronic means controlled by a pipe line meter, characterized by an accuracy as high as that of the meter used.

What is claimed is:

1. A control for a reciprocating-piston pump, having two electromagnets for actuating its piston, one on the suction and one on the pressure stroke thereof, such pump adapted for connection to a pipe line, having a meter interposed therein, to intermittently draw measured sample quantities therefrom and discharge them into a suitable receiver; a one-shot multi-vibrator adapted when triggered to produce two electrical pulses the peaks of which are always spaced from each other by the same time interval and then stops; connections, including amplifying means, from said multi-vibrator to said magnets for supplying one amplified pulse to one magnet to actuate the pump on its suction stroke and subsequently another amplified pulse to actuate the pump on its discharge stroke, and triggering means consisting of a direct current supply circuit coupled to the grid of the first section of said one-shot multi-vibrator and meter driven means for periodically making and breaking said supply circuit in timed relation with said meter.

2. The combination, as claimed in claim 1, having means for varying the rate at which said circuit is made and broken relatively to the rate of operation of the meter.

3. The combination, as claimed in claim 1, in which said triggering means is an electric generator driven by and in timed relation with the meter for intermittently producing electrical pulses, said generator being connected electrically to the grid of the first section of the one-shot multi-vibrator.

4. The combination, as claimed in claim 3, having means for varying the rate at which the generator is driven relatively to the rate of operation of the meter.

References Cited in the file of this patent

UNITED STATES PATENTS

| 2,461,045 | Fairbairn | July 26, 1949 |
| 2,693,114 | Tapp et al. | Nov. 2, 1954 |
| 2,741,917 | Piety | Apr. 17, 1956 |

FOREIGN PATENTS

| 745,990 | Germany | May 22, 1944 |

OTHER REFERENCES

Text: Electrontube Circuits, Seely McGraw-Hill Co., N.Y., 1950, pages 414–420.